(12) United States Patent
Muchsel et al.

(10) Patent No.: US 9,338,003 B2
(45) Date of Patent: May 10, 2016

(54) SECURE MODULES USING UNIQUE IDENTIFICATION ELEMENTS

(71) Applicant: Maxim Integrated Products, Inc., San Jose, CA (US)

(72) Inventors: Robert Michael Muchsel, Addison, TX (US); Sung Ung Kwak, Frisco, TX (US); Donald W. Loomis, III, Coppell, TX (US); Edward Tangkwai Ma, Plano, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/202,114

(22) Filed: Mar. 10, 2014

(65) Prior Publication Data

US 2014/0369495 A1    Dec. 18, 2014

Related U.S. Application Data

(60) Provisional application No. 61/836,529, filed on Jun. 18, 2013.

(51) Int. Cl.
*H04L 9/08* (2006.01)

(52) U.S. Cl.
CPC .................................. *H04L 9/0866* (2013.01)

(58) Field of Classification Search
CPC . G06F 2221/2107; G06F 21/34; G06Q 20/40; H04L 9/0869; H04L 9/0866; H04L 9/0662; H04L 9/0861
USPC ........................................................ 380/44
See application file for complete search history.

(56) References Cited

U.S. PATENT DOCUMENTS

| | | | | |
|---|---|---|---|---|
| 8,250,375 | B2 * | 8/2012 | Carpenter et al. | 713/189 |
| 8,284,387 | B2 * | 10/2012 | Tucker et al. | 356/73.1 |
| 8,499,172 | B2 * | 7/2013 | Nelson | G06F 21/73 713/189 |
| 2002/0024453 | A1 * | 2/2002 | Maeda | G06F 11/006 341/50 |
| 2005/0172129 | A1 * | 8/2005 | Tajima et al. | 713/171 |
| 2007/0083759 | A1 * | 4/2007 | Drew et al. | 713/168 |
| 2007/0098152 | A1 * | 5/2007 | Detrick | G06F 21/602 380/30 |
| 2007/0192631 | A1 * | 8/2007 | Anderson | G06F 21/78 713/193 |
| 2010/0223461 | A1 * | 9/2010 | Drader et al. | 380/277 |
| 2010/0241858 | A1 * | 9/2010 | Koo et al. | 713/169 |
| 2011/0073640 | A1 * | 3/2011 | Faith et al. | 235/375 |
| 2012/0198244 | A1 * | 8/2012 | Nelson | G06F 21/73 713/193 |
| 2012/0202428 | A1 * | 8/2012 | Mirbaha et al. | 455/41.2 |
| 2013/0129086 | A1 * | 5/2013 | Tang et al. | 380/44 |
| 2013/0174252 | A1 * | 7/2013 | Weber et al. | 726/20 |
| 2013/0266138 | A1 * | 10/2013 | Mantri et al. | 380/44 |
| 2013/0332736 | A1 * | 12/2013 | Kawamura et al. | 713/171 |
| 2014/0310514 | A1 * | 10/2014 | Favero | 713/153 |

* cited by examiner

*Primary Examiner* — Catherine Thiaw
(74) *Attorney, Agent, or Firm* — North, Weber & Baugh LLP (57) ABSTRACT

Various embodiments of the invention relate to secure systems and modules, and more particularly, to systems, devices and methods of generating and applying identification elements uniquely associated with modules or elements. These unique identification elements provide an improved, statistically random source from which keys may be derived. The application of these keys across various architectures result in an improvement in the security of data communicated within a system.

15 Claims, 5 Drawing Sheets

SECURE MODULES USING UNIQUE IDENTIFICATION ELEMENTS

CROSS REFERENCE TO RELATED APPLICATION

The application claims priority under 35 U.S.C. §119(e) to Provisional Application No. 61/836,529, entitled "Secure Modules Using Unique Identification Elements," filed Jun. 16, 2013, the subject matter of which is hereby incorporated herein by reference in its entirety.

BACKGROUND

A. Technical Field

The present invention relates generally to secure microcontroller systems and/or modules, and more particularly to systems and methods for employing unique identification elements within the security architecture of the secure microcontroller systems and/or modules.

B. Background of the Invention

The importance of data security within today's computing systems is well understood by one of skill in the art. Significant research and development has occurred across numerous markets in an attempt to establish security protocols and architectures that maintain the integrity of data during authentication, data transit, and storage. Although these efforts have resulted in major improvements to secure systems, there still remains meaningful risk that data within a secure system can become compromised.

The difficulty in designing and maintaining a secure computing system is related to the daunting task of addressing all of the potential vulnerabilities of the system that may compromise data security. One such vulnerability is the manner in which encryption keys are generated and maintained within the secure system as well as how these keys are implemented in authentication, communication and storage operations. If encryption keys are not derived from a sufficiently random and/or unique source, then the keys could potentially be replicated by an attacker and used to obtain information from the system. For example, if an individual is able to predict a pseudo-random number used to seed encryption keys within the system (e.g., understand the algorithm used to generate the number), then that individual could derive encryption keys to decrypt data either stored in the system or in transit between modules of the system. As a result, security engineers are constantly looking for ways in which the randomness of keys may be increased.

Figure 1:
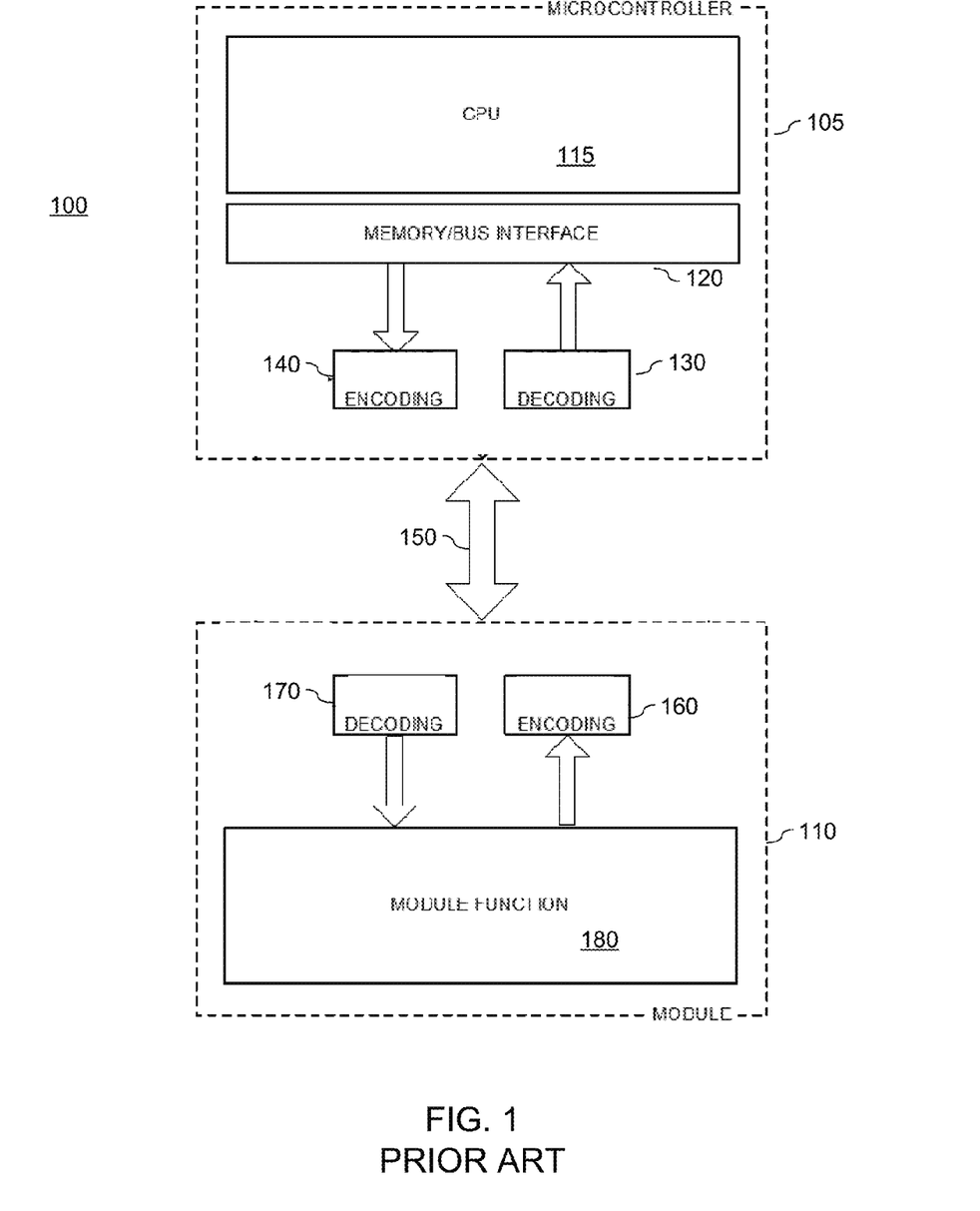
FIG. 1 is a prior art diagram illustrating a secure system comprising a microcontroller and a module.

FIG. 1 illustrates a standard architecture to illustrate how data can be attacked within a secure system. One skilled in the art will recognize that the general concept of data security, and corresponding systems and methods, are relevant in a vastly diverse set of computing systems, all of which are relevant to the present invention.

The exemplary system 100 includes a microcontroller 105 and a module 110, which communicate data using a communication channel 150. The module 110 and communication channel 150 may be realized by numerous implementations understood by one of skill in the art. The data being transmitted within communication channel 150 is encrypted. The data may also be encrypted and stored in either the microcontroller 105 or the module 110 depending on the design of the system.

Encryption keys are used within the system to encrypt and decrypt the data. These keys may be generated using various techniques including those defined by well-known protocols understood by one of skill in the art. The microcontroller 105 has both an encoding block 140 and a decoding block 130 that are used to encrypt and decrypt data. In this particular instance, the encoding and decoding blocks 130, 140 interface to a processing unit 115 or core via a memory/bus interface 120. Comparatively, the module 110 also has an encoding block 160 and a decoding block 170 that communicate with a module block 180 that can perform a function(s).

Data may be attacked at various points within this secure system 100. First, data may be attacked as it is communicated within the communication channel 150 between the microcontroller 105 and the module 110. An individual or computing device may intercept traffic within the channel 150 and attempt to decrypt the data. Second, an individual or computing device may attempt to retrieve data stored in microcontroller 105 or the module 110. If this stored data is encrypted, the individual needs to decrypt the data before it becomes useable. In both cases, the strength of the encryption keys is paramount in preventing the attacks.

What is needed are systems, devices and methods that address the above-described concerns.

SUMMARY OF THE INVENTION

The invention relates to secure systems and modules, and more particularly, to systems, devices and methods of generating and applying identification elements uniquely associated with modules or elements. These unique identification elements provide an improved, statistically random source from which keys may be derived. The application of these keys across various architectures result in an improvement in the security of data communicated within a system.

In certain embodiments, the unique identification element is tied to one or more physical characteristics of modules/elements within the system itself. In various embodiments, the unique identification element relates to a semiconductor signature of a semiconductor wafer. A semiconductor signature or characteristic may be derived from or relate to subtle physical differences among semiconductor devices in a single die and among semiconductor dies located at different locations across a wafer. These differences originate from non-uniformity and small imprecisions in lithography and wafer processing steps, even though the devices or dies are intended to be identical. A physical element within a system demonstrates its specificity for its electrical, mechanical, magnetic, chemical and other properties.

The differences may be statistically random and small, and in accordance with certain embodiments of the invention may be measurable as small gradients across the wafer in more than one direction, and very small differences in capacitance, speed, or temperature sensitivity from one transistor to the next. These differences are utilized to generate statistically random numbers that are unique, non-duplicable and repeatable, which are used to strengthen encryption keys derived therefrom.

One skilled in the art will recognize that the strengthening of encryption keys is applicable in a large number of architectures. One skilled in the art will further recognize that a semiconductor die may have a large number of physical characteristics that are statistically random from one wafer to the next, and from one die to the next, all of which may be useful in generating an encryption key and should fall within the scope of the present invention.

BRIEF DESCRIPTION OF THE DRAWINGS

Reference will be made to exemplary embodiments of the present invention that are illustrated in the accompanying figures. Those figures are intended to be illustrative, rather

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment" it is intended mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used to secure communication, data transfer and data storage in systems comprised of a structured module(s). Structured modules are components of a system with defined relationships and defined hierarchies between two or more modules. A module may be a memory module, microcontroller, coprocessor, or any other device within a system that communicates and/or receives information within the system. One or more of the modules includes a unique identification element that is used to generate encryption keys to securitize data stored within the system, transmitted within the system or transmitted from the system. These systems, and the module(s) therein, may be integrated on a single substrate or contain discrete components. Furthermore, embodiments of the invention are applicable to a diverse set of encryption protocols and techniques that may be employed within the system after encryption keys have been generated.

Figure 2:
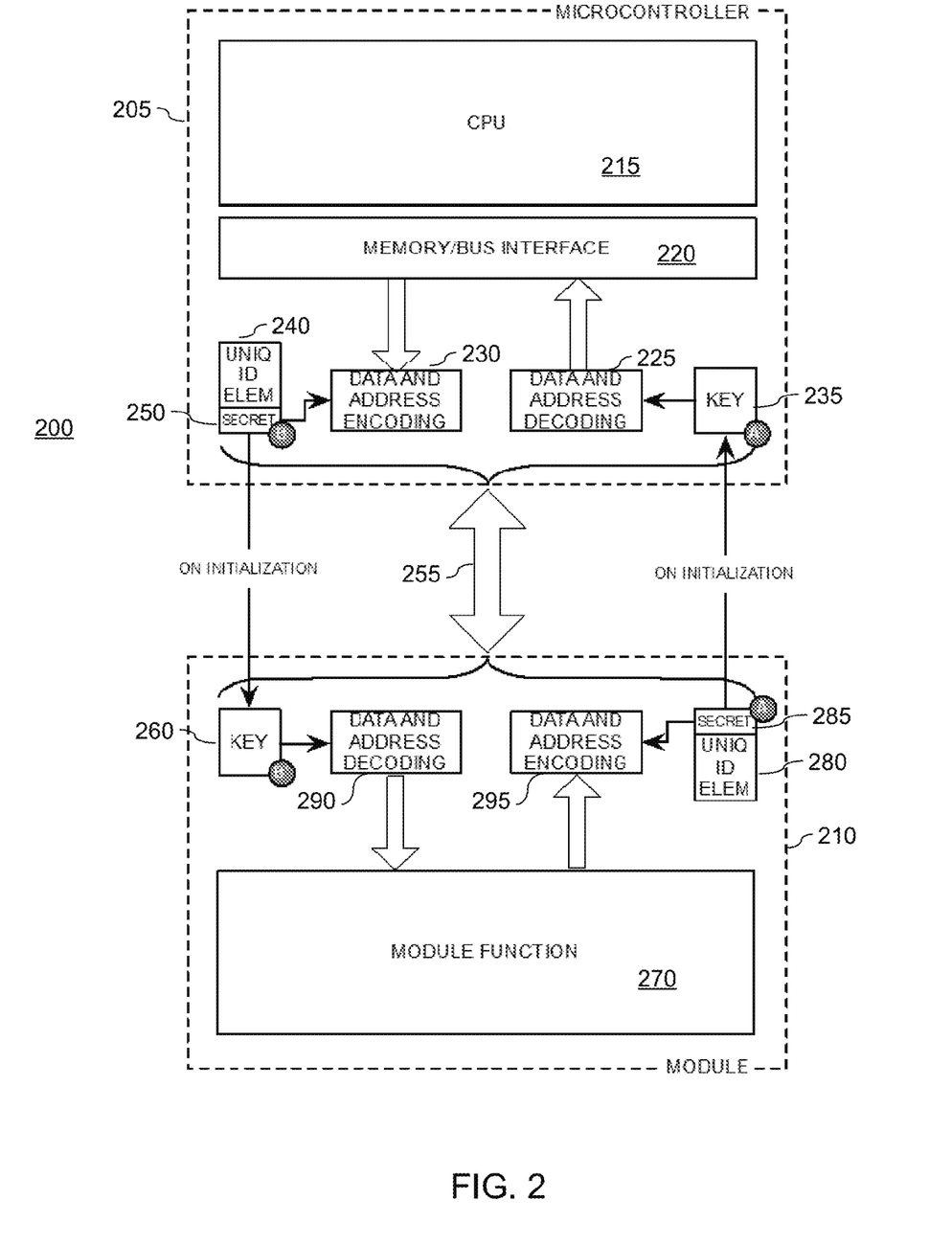
FIG. 2 is a two-way linked secure system in which unique identification elements are used within the security architecture of the system according to various embodiments of the invention.

FIG. 2 illustrates a two-way linked secure system 200 in which unique identification elements are used within the security architecture of the system according to various embodiments of the invention. The system comprises a microcontroller 205 and a module 210. The microcontroller includes a processing unit 215 or core and an interface 220 that couples to an encoding block 230 and a decoding block 225. In certain embodiments, the encoding and decoding blocks 225, 230 encode/decode both the data and address associated with an instruction or data block.

A unique identification element 240 within the microcontroller 205 is coupled to a first secret generator 250 that generates a first secret (Secret B) for subsequent use within the security architecture of the system. This first secret may be used to seed an encryption key(s) or be used as the key itself. This key may support symmetric or asymmetric block encryption, a streaming cipher approach, data scrambling, or other encryption methods known to one of skill in the art. A memory 235 that stores a decryption key(s) is also within the microcontroller and may be part of a larger memory or may be a discrete memory. The key memory 235 may also have security features related to tamper detection, unauthorized probing, etc. The key memory 235 stores a key(s) that allows data from the module 210 to be decrypted at the microcontroller.

The module 210 is coupled to the microcontroller 205 via a communications channel 255, which can be wired or wireless and operate under any communication protocol. The module 210 comprises a function block 290 that performs one or more functions within the system. For example, the functional block 290 may perform operations related to a memory, a digital signal processor, a graphics processing unit, a communications engine, a cryptographic coprocessor, or any other type of module with which the microcontroller 205 communicates.

The module 210 also includes an encoding block 295 and a decoding block 290 that supports encrypted communication with the microcontroller 205. The encoding and decoding block 290, 295 may encode data and/or an address(es) associated with an instruction or data block. The module 210 further comprises a unique identification element(s) 280 that is coupled to a second secret generator 285 that generates a second secret (Secret A). This second secret may be used to seed an encryption key(s) or be used as the key itself. A key memory 260 is also within the module 210 and may be part of a larger memory or may be a discrete memory. This key memory 260 may also have security features related to tamper detection, unauthorized probing, etc. The key memory 260 stores a key(s) that allows data from the microcontroller 205 to be decrypted at the module 210.

In certain embodiments, the unique identification elements 240, 280 are identification values associated and/or derived from the physical characteristics of the microcontroller 205 or module 210. In one example, a semiconductor signature or characteristic(s) are used as the unique identification elements or are used to seed a process that generates the unique identification elements. A semiconductor signature or characteristic may be derived from or relate to subtle physical differences among semiconductor devices in a single die and among semiconductor dies located at different locations across a wafer. These differences originate from non-uniformity and small imprecisions in lithography and wafer processing steps, even though the devices or dies are intended to be identical. When the physical elements are manufactured from semiconductor processing, they may be placed at different physical locations or oriented differently, and local semiconductor process characteristics are not entirely consistent for these physical elements. As a result, each physical element demonstrates its specificity for its electrical, mechanical, magnetic, chemical and other properties.

The differences may be statistically random and small, and may be measurable as small gradients across the wafer in more than one direction, and very small differences in capacitance, speed, or temperature sensitivity from one transistor to the next. For instance, two otherwise identical capacitors might differ by 0.1% in capacitance due to difference in dielectric thickness and plate area. The former may be caused by variation in a dielectric formation step, while the latter results from variations in lithography or etching. Semiconductor design normally strives to minimize these differences such that performance of the end product is controlled within a certain tolerance. However, the differences are utilized here to generate statistically random numbers that are unique, non-duplicable and repeatable.

One skilled in the art will recognize that other characteristics of either the microcontroller 205 or the module 210 may be used as identification elements within the security framework of the system.

One skilled in the art will recognize that the two-way linked secure system 200 may operate in accordance with various methods. In one example, operation of the secure system includes an initialization phase and a module access phase. On system initialization (or power-up or in accordance with a pre-defined schedule), the module 210 generates a secret (Secret A) 285 from its unique identification element(s) 280. The microcontroller 205 also generates a secret (Secret B) 250 from its unique identification element(s) 240. As previously mentioned, the secrets (Secret A and B) may be the unique identification elements or may be the result of a mathematical function seeded by the unique identification elements. Secret B 250 is provided to the module 210 and stored in memory 260. Secret A 285 is provided to microcontroller 205 and stored in memory 235. As a result, both the microcontroller 205 and module 210 have encryption and decryption keys to support secure communication. Importantly, the security of these keys is enhanced because each was derived from a highly secret element that is very difficult to detect and/or replicate.

The module access phase allows the microcontroller 205 to access the module function 290 which may require data and address information to be processed on the module 210. In certain embodiments, an instruction is generated and encrypted using Secret B in the encoding block 230 on the microcontroller. The encoded instruction is transmitted to the module 210 via channel 255. The decoding block 290 receives an instruction from the microcontroller 205. Using the Secret B 250 stored in key memory 260, the decoding block 290 decodes the instruction (or data block) and passes the decrypted instruction to the module function 290 for subsequent processing. In one example where the module 210 relates to memory, a read operation is sent from the microcontroller 205 to the module 210. The request is decoded using a similar method and processed in the memory module such that a corresponding block of data is read from an associated memory.

The methods and systems described above reference a microcontroller with a single module. However, one skilled in the art will recognize that the scope of the invention can be applied to any type or number of modules that securely communicate with a microcontroller or other device. The security framework provides not only heightened security in the generation of secrets or keys, but also allows modules to be linked/bonded together through the exchange of keys derived from physical characteristics of the modules. In a typical system, peripheral modules are bonded to a microcontroller and cannot be replaced without cooperation of the microcontroller, thus preventing unauthorized system modifications and protecting the integrity of data stored therein.

Figure 3:
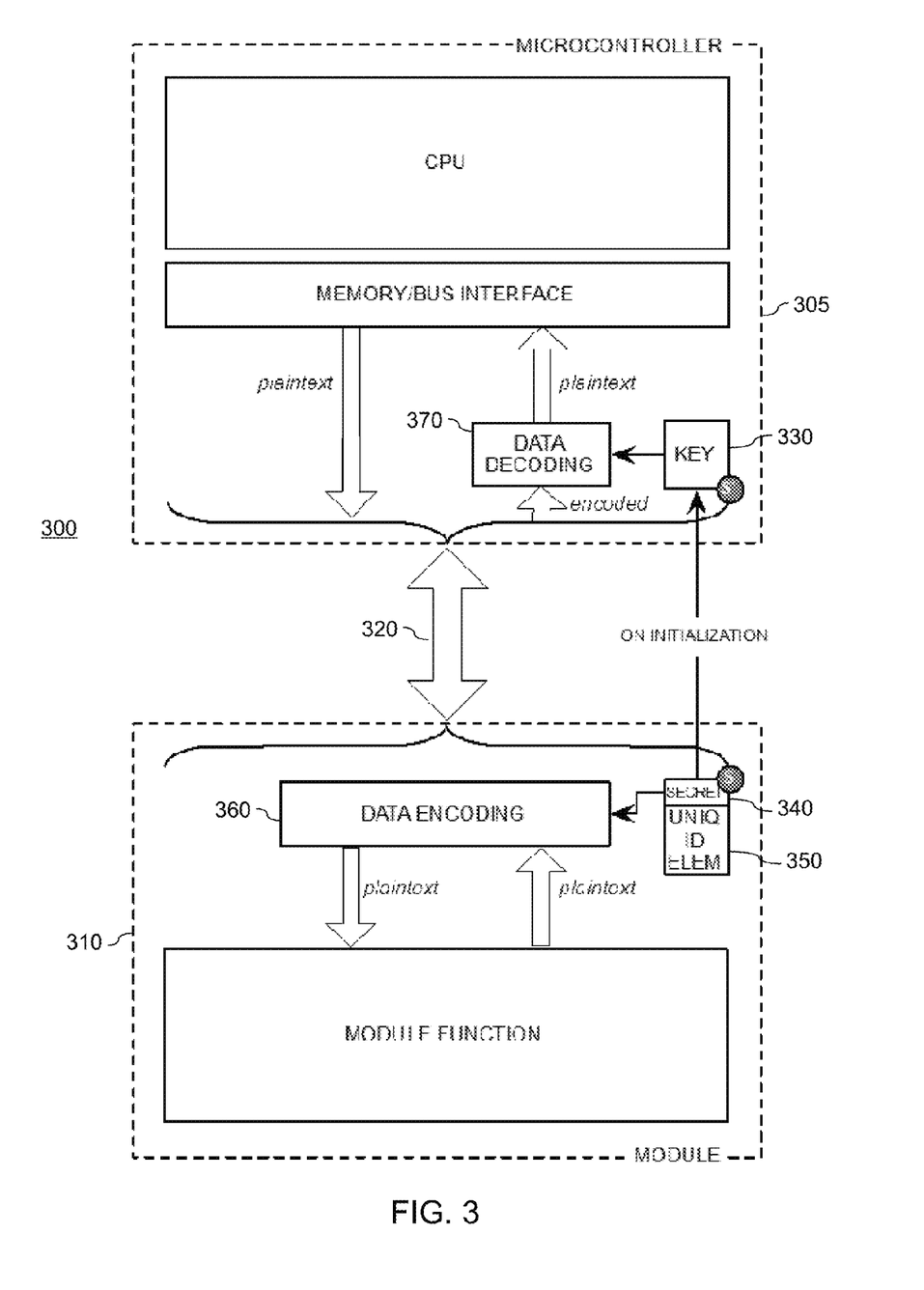
FIG. 3 is a one-way linked secure system in which a unique identification element(s) are used within the security architecture of the system according to various embodiments of the invention.

FIG. 3 is a one-way linked secure system in which a unique identification element(s) are used within the security architecture of the system according to various embodiments of the invention. Various embodiments of the invention support a uni-directional communication system or a bi-directional communication system in which only one direction is encrypted.

In the exemplary one-way linked secure system of FIG. 3, communication from a module 310 to a microcontroller 305 is encrypted using a secure key. In a similar manner discussed above, a unique identification element 350 on the module 310 is used by a secret generator 340 as an encryption key or as a seed to generate the key. The key is transmitted to the microcontroller 305 and stored within a key memory 330. Communication from the module 310 is encoded within the encoding block 360 and transmitted to the microcontroller 305 via channel 320. A decoding block 370 accesses the key and decodes the communication for subsequent processing.

One skilled in the art will recognize that various implementations may be realized within the architecture described and scope of the invention. For example, a module may also be authenticated to a microcontroller or other device. In one example, the authentication procedure includes an initialization phase and a module verification phase. On system initialization (e.g., in the factory), a module's unique identification 350 element information is recorded either in the system's microcontroller 305 or in a networked verification server. The module 310 is locked to prevent further direct dissemination of the unique identification element 350 information.

During the module verification phase, the microcontroller 305 creates a unique or random number that will be used to authenticate the module 310. This number is communicated to the module 310 as a challenge number used in a challenge and response method. The module 310 computes a response based on the challenge number and its unique identification element 350. One skilled in the art will recognize that the challenge number and the unique identification element may be combined or operated upon in various ways within the authentication procedure. In one example, the module 310 computes a secure hash of the unique identification element 350 and the challenge number. The result of the hash is transmitted to the microcontroller 305. Because the microcontroller 305 knows the challenge number, unique identification element 350 and hashing operation, the microcontroller can authenticate the module 310 based on the response. As previously mentioned, the microcontroller 305 may use a verification server as a part of this process.

One skilled in the art will recognize that the above-described architecture can support variants of modular authentication. For example, multiple unique identification elements may be used to enhance the randomness and strength of both the authentication and/or authentication operation. In one instance, a first public element would serve as a public module identification and a second secret element would be used for the computation of the verification as described above. To further strength the security system, the module 310 creates a random number before computing the response. This additional generation of a random number can be implemented within the security protocol to thwart certain attacks such as known-plaintext attacks.

In the example where the module 310 creates random number, the module 310 computes a response based on the challenge number, the unique identification element 350 and the locally generated random number. For example, the module 310 computes a secure hash of the unique identification element 350, challenge number and the locally generated random number. The result of the computation and the random number are returned to the microcontroller 305. The microcontroller 305 checks the response either based on its own knowledge of the module's unique identification element 350 or via the networked verification server.

The previously described examples describe the secure communication or authentication of a module to a microcontroller. However, one skilled in the art will recognize that other systems may implement various embodiments of the invention. Any sufficient intellectual property, system, device or method in which a unique identification element may be implemented on one or both sides of a data exchange may benefit from the enhanced security of the present invention.

Figure 4:
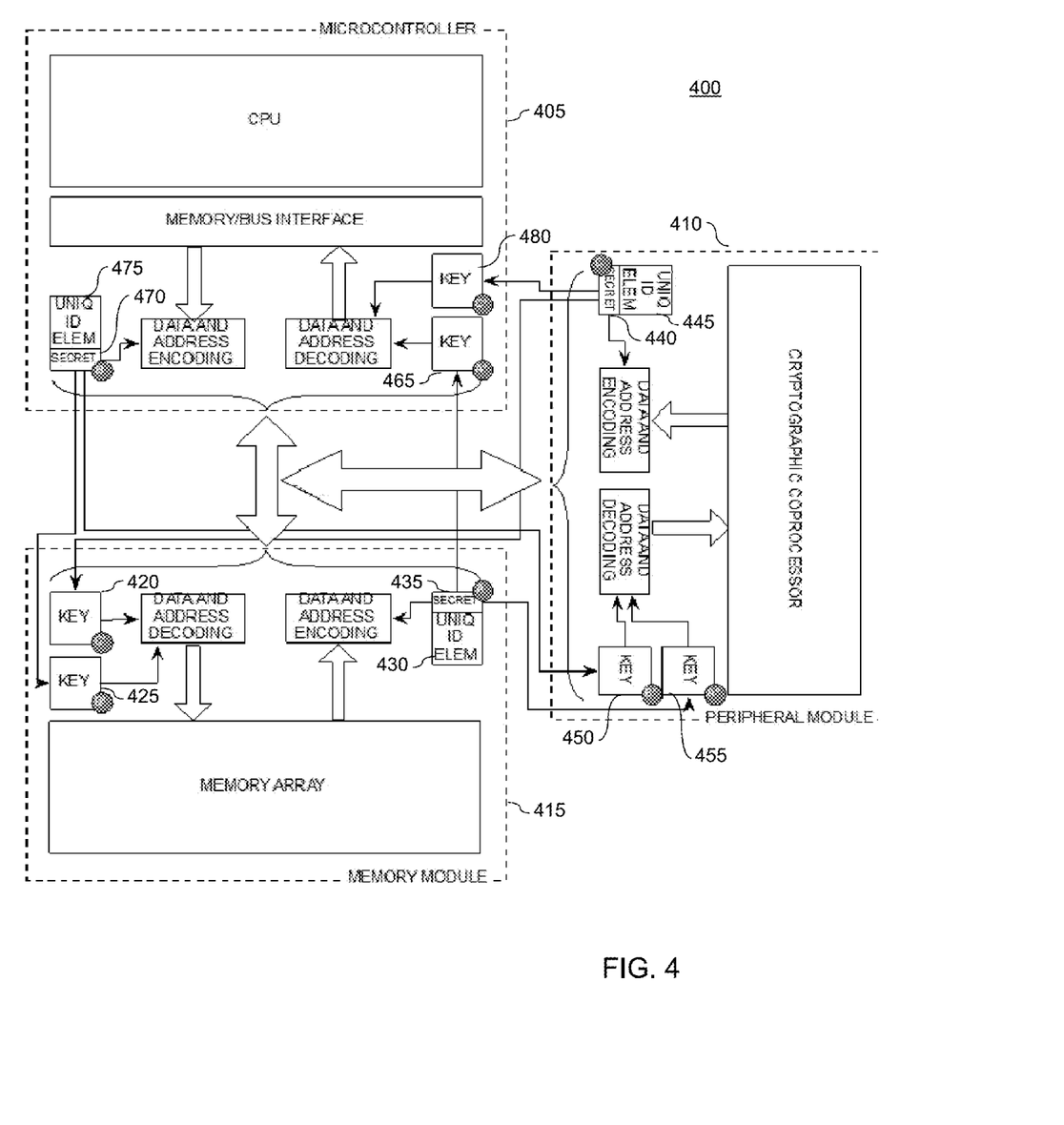
FIG. 4 is a multi-master secure system in which unique identification elements are used within the security architecture of the system according to various embodiments of the invention.

In complex structured systems, both a microcontroller and one or more additional modules may use the invention. For example, in a microcontroller bus system, a cryptographic coprocessor may take advantage of the encoding and protection provided by various embodiments of the invention. In one such example, FIG. 4 illustrates a system with two bus masters. In other cases, peripheral modules with bus-mastering capabilities (DMA) may also be able to communicate with other encoded peripheral modules or with memory modules.

Referring to FIG. 4, multiple modules may communicate or be authenticated to a microcontroller or other module. In this example, the security architecture supports a three phase process in which secure information is exchanged between a microcontroller 405, a peripheral module (e.g., coprocessor) 410, and a memory module 415.

On system initialization, or power-up, or upon pre-agreed schedule, the memory module 415 generates secret A using secret generator 435 and unique identification element 430. The microcontroller 405 generates secret B using secret generator 470 and unique identification element 475. The coprocessor module 410 generates secret C using secret generator 440 and unique identification element 445. As previously discussed, secrets A, B, and C may be derived directly from a unique identification element or the result of a mathematical calculation in which the unique identification element is used as a seed.

The microcontroller 405 communicates secret B (e.g., unique identification element 460 or value derived from unique identification element 460) to the memory module 415 and the coprocessor module 410. The memory module 415 communicates secret A to the microcontroller 405 and the coprocessor module 410. The coprocessor module 410 communicates secret C to the microcontroller 405 and the memory module 415. These communications can be clear text or using cryptographic secret key exchange protocols known to one of skill in the art. These protocols may include both asymmetric and symmetric methods, which may or may not depend on whether the secrets need to be protected.

The memory module 415 stores secret B in memory 425 and secret C in memory 420. The microcontroller stores secret A in memory 465 and secret C in memory 480. The coprocessor module 410 stores secret A in memory 455 and secret B in memory 450. The distribution of secrets within corresponding key memories will support secure communication between the multiple modules and the microcontroller.

Once a secure communication infrastructure has been established within the system, the microcontroller 405 can securely access the memory module 415. In such an instance, address and/or data information (depending on write or read operation) are processed using the encoder with the microcontroller 405. The encoder uses secret B as an additional input so that information is properly encrypted. The encoder can be a cryptographic function (either symmetric or asymmetric) or a scrambler. The encrypted information is communicated over a communications channel to the memory module 415.

The memory module 415 decrypts the access request/information using secret B using a decoder and performs the corresponding action. One skilled in the art will recognize that this action may relate to a read operation or a write operation. In the case of a write operation, the data received from the microcontroller 405 is written to memory. In the case of a read operation, the memory module 415 retrieves corresponding data from memory and uses secret A and the encoder to encrypt the result. The result is communicated over a communications channel to the microcontroller 405, which decodes the result using secret A and its decoder.

The coprocessor 410 can also securely access the memory module 415. This operation is performed in a similar manner as described above using the corresponding secrets shared between the coprocessor module 410 and memory module 415.

It is also important to note that microcontroller 405, coprocessor module 410 and memory module 415 may be authenticated using the authentication operations previously described.

Figure 5:
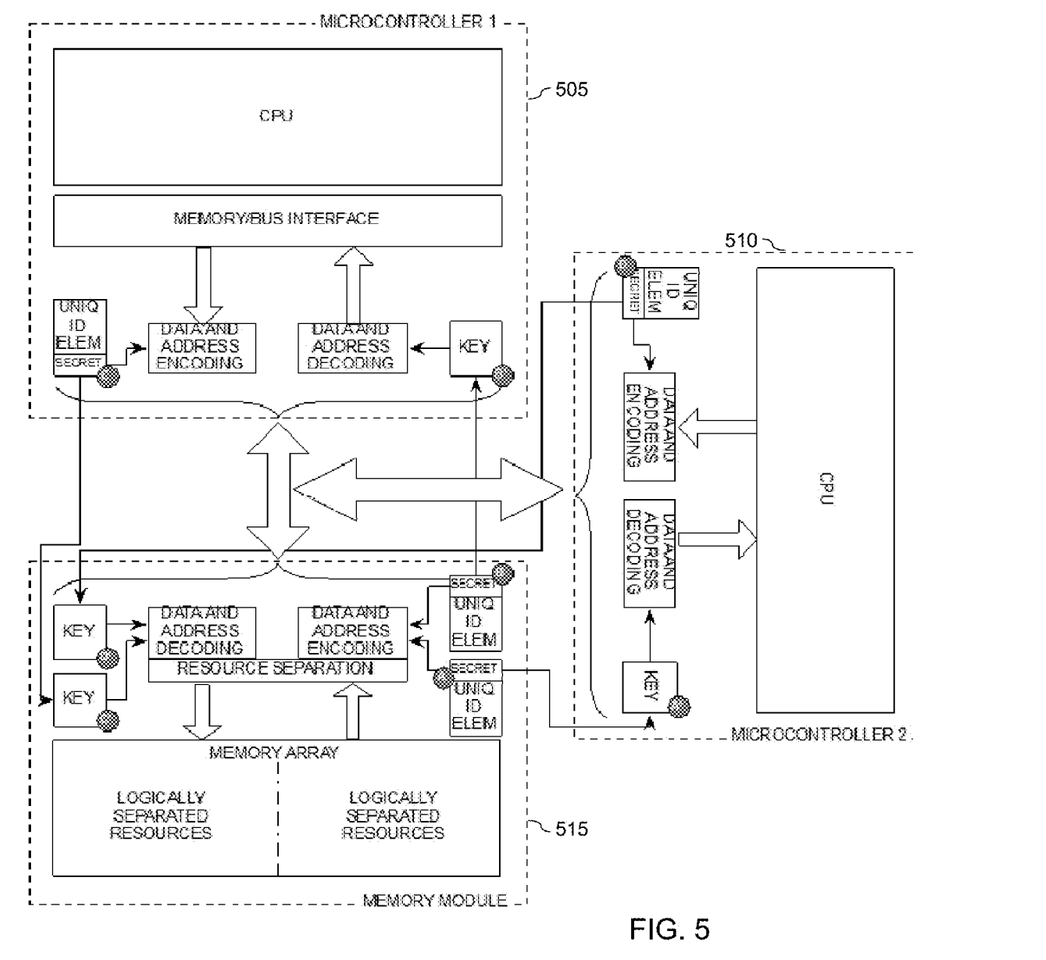
FIG. 5 is a secure system in which logically separated resources are shared across a plurality of microcontrollers and unique identification elements are used within the security architecture of the system according to various embodiments of the invention.

One skilled in the art will also recognize that various embodiments of the invention support secure communication and authentication in a system having multiple microcontrollers and one or more modules. FIG. 5 is a secure system in which logically separated resources are shared across a plurality of microcontrollers and unique identification elements are used within the security architecture of the system according to various embodiments of the invention. In this example, the module is a memory module 515; however, any type of module may be used in accordance with the spirit and scope of the present invention.

A common problem encountered in system with structured modules is the sharing of a module's resources across a plurality of microcontrollers or other modules. For example, if there are two microcontroller cores, it is more economical to share a single memory instance than having two separate memories.

Sharing a module may have security and resource availability implications. It may be desirable to limit access to data contained in the shared module to only one microcontroller and make it impossible for the second microcontroller to determine or alter that data, or to limit one microcontroller to a predetermined share of the module's resources to guarantee resource availability to the second microcontroller.

Applying the above described systems, devices and methods, one skilled in the art will recognize that these architectures support a logically divided and separated resources of a module (e.g., memory cells) or limit access to a resource (e.g., graphics processing cores) to less than 100 percent of the total number of resources. FIG. 5 illustrates an exemplary multi-core architecture in which resources are shared across two microcontrollers. One skilled in the art will recognize that various other multi-core architectures may benefit from the security architecture of the present invention.

Referring to FIG. 5, a first microcontroller 505 and a second microcontroller 510 share a memory module 515. As illustrated in this figure and similar to certain functionality in FIG. 4, the module and multiple microcontrollers communicate with each other securely using secrets associated with unique identification elements on the memory module and microcontrollers. An exchange of secrets within the system allows the microcontrollers and memory to securely communicate and manage resources throughout the system.

In this example, the module with the shared resource (e.g., memory) contains more than one unique identification element and associated secrets (e.g., keys derived from the unique identification elements or seeded therefrom), as well as an additional resource separation block. Depending on system requirements, this block can be simple (e.g., using the resource address for separation), or more complex (e.g., accounting for and considering frequency of resource usage, system load, and other system and external state inputs).

Regardless of the particular implementation of the resource separation block, the use of multiple, separate keys from unique identification elements effectively prevents one microcontroller from accessing any resource that was allocated for use by another microcontroller. Furthermore, while the example shows two microcontrollers and a memory, this technique applies to any number of shared modules with any number of resource-using modules in any structured module system. Examples of resource-using modules include, but are not limited to, microcontrollers, graphics processing units, digital signal processors, cryptographic coprocessors, etc. Shared modules' resources include, but are not limited to, memories, input/output peripherals or any other resource-using module known to one of skill in the art. Any of the resource-using modules can also be providers of resources in certain embodiments of the present invention.

The foregoing description of the invention has been described for purposes of clarity and understanding. It is not intended to limit the invention to the precise form disclosed. Various modifications may be possible within the scope and equivalence of the appended claims.

We claim:

1. A secure system comprising:
a microcontroller comprising:
    a processing unit;
    a first unique identification element having a first unique identification value obtained by measuring at least one gradient of a first physical characteristic of the microcontroller;
    a first secret generator adapted to receive the first unique identification value and to generate a first secret from the first unique identification value;
a module adapted to communicate with the microcontroller, the module comprising:
    a second unique identification element having a second unique identification value obtained by measuring at least one gradient of a second physical characteristic of the module;
    a second secret generator adapted to receive the second unique identification value and to generate a second secret from the second unique identification value; and
wherein a first encryption key associated with the first secret is stored within the module and a second encryption key associated with the second secret is stored within the microcontroller, the first and second encryption keys support secure communication between the microcontroller and the module and
wherein the first and second encryption keys are generated during initialization of the secure system.

2. The system of claim 1 wherein the first secret is a first seed used to derive the first encryption key and the second secret is a second seed used to derive the second encryption key.

3. The system of claim 1 wherein the first secret is the first encryption key and the second secret is the second encryption key.

4. The system of claim 1 wherein the first unique identification element relates to a semiconductor characteristic of the microcontroller.

5. The system of claim 1 wherein the at least one gradient of the first physical characteristic of the microcontroller or the at least one gradient of the second physical characteristic of the module is selected from a group consisting of capacitance, speed sensitivity between transistors, and temperature sensitivity between transistors.

6. The system of claim 1 wherein the microcontroller further comprises:
    an encoding module adapted to receive the first encryption key and encode first data using the first encryption key, the first data being subsequently transmitted to the module;
    a data decoding module adapted to receive the second encryption key and decrypt second data using the second encryption key, the second data having been previously received from the module.

7. The system of claim 6 wherein the encoding module encrypts at least one address associated with the first data and the decoding module de-encrypts at least one address associated with the second data.

8. The system of claim 1 wherein the secure module further comprises:
    an encoding module adapted to receive the second encryption key and encrypt second data using the second encryption key, the second data being subsequently transmitted to the microcontroller; and
    a decoding module adapted to receive the first encryption key and decrypt first data using the first encryption key, the first data having been previously received from the microcontroller.

9. The system of claim 1 wherein the first encryption key is transmitted from the microcontroller to the module and the second encryption key is transmitted from the module to the microcontroller during initialization of the system.

10. The system of claim 1 further comprising a second module, the second module comprising:
    a third unique identification element having a third unique identification value associated with a third physical characteristic of the second module; and
    a third secret generator adapted to receive the third unique identification value and to generate a third secret from the third unique identification value; and
    wherein a third encryption key associated with the third secret is stored within the microcontroller and the module, the third encryption keys supports secure communication between the second module and the microcontroller and/or the module.

11. A method of initializing secure communication between a microcontroller and a module in a secure system, the method comprising:
    obtaining a first unique identification value by measuring a first unique identification element, the first identification element obtained by measuring at least one gradient of a first physical characteristic of the microcontroller;

generating a first secret using the first unique identification value;

deriving a first encryption key from the first secret;

storing the first encryption key within the module;

obtaining a second unique identification value by measuring a second unique identification element, the second identification element obtained by measuring at least one gradient of a second physical characteristic of the module;

generating a second secret using the second unique identification value;

deriving a second encryption key from the second secret;

storing the second encryption key within the microcontroller; and wherein the first and second encryption keys are used to encrypt and decrypt data between the microcontroller and the module;

wherein generating the first and second encryption keys is performed during initialization of the secure system.

12. The method of claim 11 wherein the first secret is the first encryption key and the second secret is the second encryption key.

13. The method of claim 11 the first secret is a first seed used to derive the first encryption key and the second secret is a second seed used to derive the second encryption key.

14. The method of claim 11 wherein the at least one gradient of the first physical characteristic of the microcontroller or the at least one gradient of the second physical characteristic of the module is selected from a group consisting of capacitance, speed sensitivity between transistors, and temperature sensitivity between transistors.

15. The method of claim 11 wherein the second encryption key is used to authenticate the module to the microcontroller.

* * * * *